United States Patent
Tootoonchian

(10) Patent No.: US 10,191,854 B1
(45) Date of Patent: Jan. 29, 2019

(54) EMBEDDED RESILIENT DISTRIBUTED DATASET SYSTEMS AND METHODS

(71) Applicant: Levyx, Inc., Irvine, CA (US)

(72) Inventor: Ali Tootoonchian, Irvine, CA (US)

(73) Assignee: Levyx, Inc., Irvine, CA (US)

( * ) Notice: Subject to any disclaimer, the term of this patent is extended or adjusted under 35 U.S.C. 154(b) by 0 days.

(21) Appl. No.: 15/370,784

(22) Filed: Dec. 6, 2016

(51) Int. Cl.
*G06F 12/02* (2006.01)
*G06F 12/1009* (2016.01)

(52) U.S. Cl.
CPC ...... *G06F 12/1009* (2013.01); *G06F 12/0238* (2013.01); *G06F 2212/1008* (2013.01); *G06F 2212/657* (2013.01)

(58) Field of Classification Search
CPC ................... G06F 2212/1008; G06F 2212/657
See application file for complete search history.

(56) References Cited

U.S. PATENT DOCUMENTS

| | | |
|---|---|---|
| 8,041,878 B2 | 10/2011 | Lee |
| 8,103,899 B2 | 1/2012 | Shiota et al. |
| 8,713,283 B2 | 4/2014 | Sinclair |
| 2007/0245114 A1 | 10/2007 | Kakui et al. |
| 2011/0060887 A1* | 3/2011 | Thatcher ............... G06F 3/0604 711/171 |
| 2012/0179891 A1* | 7/2012 | Edwards ........... G06F 17/30233 711/203 |
| 2015/0026417 A1* | 1/2015 | Guo ......................... H04L 29/08 711/145 |
| 2015/0154118 A1 | 6/2015 | Marcu et al. |
| 2015/0317083 A1* | 11/2015 | Phan ..................... G06F 3/0608 711/103 |
| 2016/0011996 A1 | 1/2016 | Asaad et al. |
| 2016/0070593 A1* | 3/2016 | Harris ................... G06F 9/4843 718/106 |
| 2016/0170882 A1* | 6/2016 | Choi .................... G06F 12/0806 711/119 |
| 2016/0170903 A1 | 6/2016 | Kanno et al. |
| 2016/0179395 A1* | 6/2016 | Fisher .................. G06F 3/0608 711/103 |
| 2016/0210066 A1 | 7/2016 | Yamaura et al. |

OTHER PUBLICATIONS

Zaharia, M. et al, "Resilient Distributed Datasets: A Fault-Tolerant Abstraction for In-Memory Cluster Computing", Networked Systems Design and Implementation, 2012.

* cited by examiner

*Primary Examiner* — Mano Padmanabhan
*Assistant Examiner* — William E. Baughman
(74) *Attorney, Agent, or Firm* — Fish IP Law, LLP

(57) ABSTRACT

A system for providing both low-level, physical data access and high-level, logical data access to a single process is disclosed, having a data block table with a physical memory address portion and a logical memory address portion. Data blocks that are mapped to physical memory bypass multiple logical memory address layers, such as the operating system layer and a logical block address layer, while data blocks that are mapped to the logical memory will be routed through traditional API layers, providing both increased performance and flexibility.

19 Claims, 7 Drawing Sheets

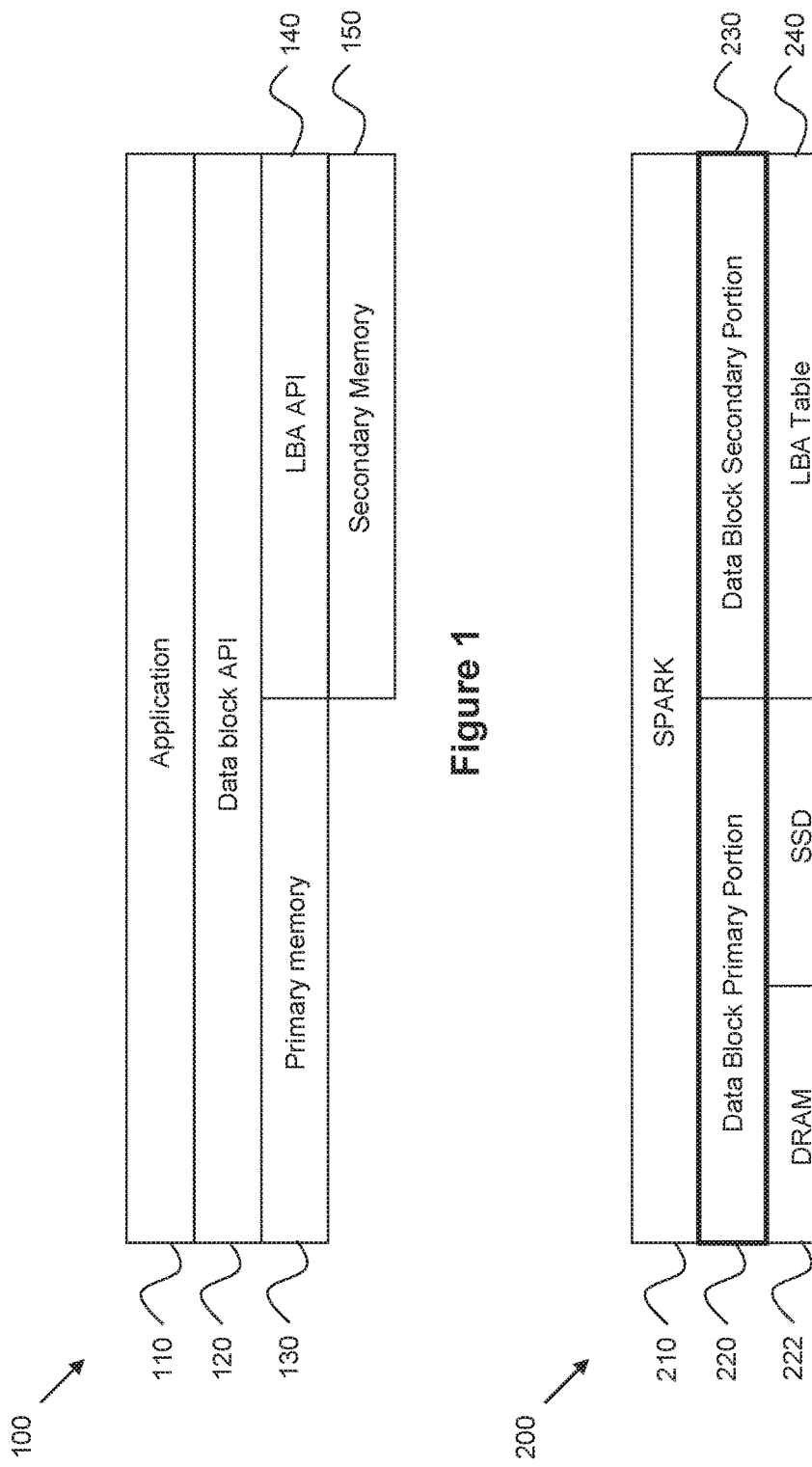

| #0 | #100 | Prim |
|---|---|---|
| #1 | #200 | Prim |
| #2 | #300 | Prim |
| #3 | #400 | Prim |
| #4 | #500 | Prim |
| #5 | #600 | Prim |
| #6 | #700 | Prim |
| #7 | #800 | Prim |
| #8 | #900 | Prim |
| #9 | #1000 | Prim |
| #10 | #1662 | Sec |
| #11 | #117 | Sec |
| #12 | #2006 | Sec |
|  | #1800 | Sec |
|  | #1900 | Sec |
|  | #2000 | Sec |
|  | #486 | Sec |
|  | #1620 | Sec |
|  | #347 | Sec |

Figure 3B

| #0 | #100 | Prim |
|---|---|---|
| #1 | #200 | Prim |
| #2 | #300 | Prim |
| #3 | #400 | Prim |
| #4 | #500 | Prim |
| #5 | #600 | Prim |
| #6 | #700 | Prim |
| #7 | #800 | Prim |
| #8 | #900 | Prim |
| #9 | #1000 | Prim |
| #10 | #620 | Sec |
| #11 | #1006 | Sec |
| #12 | #30 | Sec |
| #13 | #802 | Sec |
| #14 | #16632 | Sec |
| #15 | #87 | Sec |
| #16 | #203 | Sec |
| #17 | #3 | Sec |
| #18 | #1862 | Sec |
| #19 | #127 | Sec |

Figure 3A

EMBEDDED RESILIENT DISTRIBUTED DATASET SYSTEMS AND METHODS

FIELD OF THE INVENTION

The field of the invention is electronic data structures.

BACKGROUND

The background description includes information that may be useful in understanding the present invention. It is not an admission that any of the information provided herein is prior art or relevant to the presently claimed invention, or that any publication specifically or implicitly referenced is prior art.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The amount of information accessible via computer devices is constantly increasing. Accessing increasing amounts of information can be time-consuming for even the most advanced computer systems without systems and methods. There are often many translation layers between an application and the underlying storage memory, which may only take milliseconds to traverse, but millions and billions of data transactions, traversing such translation layers could add significant time delays.

U.S. Pat. No. 8,041,878 to Lee teaches a flash file system with a flash memory and a subsystem that interfaces between the flash memory and the host system. The host system writes data to a cache memory that temporarily holds data before writing. A flash translation layer unit in the subsystem maps a logical address received from the host system interface and the cache memory to a physical address of the flash memory. Lastly, a flash memory interface transfers data to the flash memory from the cache memory system based on the physical address. Lee's system, however, requires data to be translated several times: first by the host system when an application wishes to write data to memory, then by the flash translation layer. In addition, Lee's system requires the data to be copied twice: first to the cache memory, and then to the physical address. While such steps are necessary to maintain a layered infrastructure, taking such intermediary steps every time data needs to be transferred can be time-consuming.

U.S. Pat. No. 8,713,283 to Sinclair teaches a system for interfacing a system operating through logical address space with a direct file storage medium by generating file objects manageable by the direct file storage medium using logical block addresses. Data files generated by a host are identified to the memory system by file number and offsets of data within the file. Sinclair's memory system controller directly maps the files to the physical blocks of the memory cell array and maintains directory and index table information of the memory blocks into which host files are stored. By identifying host data by file objects instead of using logical addresses, Sinclair's memory system controller can store the data in a manner that reduces the need for frequent data consolidation and collection. Sinclair's system, however, still requires additional translation layers between the application and the physical data object in the form of a data file that is mapped to physical blocks of the memory cell array. Sinclair's system also maps all data files directly to physical blocks of the memory cell array, and does not allow the data files to be mapped to logical blocks as well as physical blocks.

Thus, there remains a need for a system and method to improve the manner in which data is accessed by an application.

SUMMARY OF THE INVENTION

The following description includes information that may be useful in understanding the present invention. It is not an admission that any of the information provided herein is prior art or relevant to the presently claimed invention, or that any publication specifically or implicitly referenced is prior art.

The following description includes information that may be useful in understanding the present invention. It is not an admission that any of the information provided herein is prior art or relevant to the presently claimed invention, or that any publication specifically or implicitly referenced is prior art.

The inventive subject matter provides apparatus, systems, and methods in which data blocks are accessed using a data block table that has a primary address portion for directly correlating data block addresses to physical memory addresses of a primary memory and a secondary address portion for indirectly correlating data block addresses to logical block addresses of a secondary memory. Any suitable data blocks for a database storage system could be used, for example resilient distributed dataset (RDD) blocks for an Apache Spark database or Apache Hadoop data blocks. The database storage system could be programmed to use any portion of the data block accessing system as a persistent memory. The primary memory could also act as an intermediate computation memory space, for example, as an intermediate RDD scratch pad for an Apache Spark database.

The data block table has at least two discrete portions: a secondary address portion and a primary address portion. The secondary address portion could be programmed to have similar features of known data block tables. For example, the secondary address portion could map a data block address to one or more logical block addresses. A logical block addressing (LBA) table maps each logical block address to one or more secondary memory addressees of a secondary memory, such as a hard disk drive or an Alluxio™ storage module (www.alluxio.org). Since this storage hierarchy allows a single data block to be scattered among a plurality of discrete secondary memory locations, the secondary address portion may be used for data that does not need to persist at all times in the database storage system.

In contrast, the primary address portion maps data block addresses to physical addresses of a primary memory. Exemplary primary memory storage mediums include, for example, solid state drives (SSD) and other rapidly accessible computer-readable storage medium. Preferably, the system is configured such that there is a one-to-one ratio between the data block and a contiguous block in the primary memory to ensure that the data block is not split between sections of non-contiguous memory storage segments. For example, where the data block is an Apache Hadoop data block, the contiguous primary memory size could be set to be the Apache Hadoop block size. The primary address portion could associate each stored physical memory address with a size of a memory allocation such that each data block address is associated with a physical memory address and a block size. The primary address portion preferably comprises a hashmap, such that the virtual data block address is mapped to a hashed physical memory address. The primary address portion may be referred to as a virtual to physical (V2P) hashmap that maps a data block address to a physical memory address.

Preferably, the system initializes the primary memory by allocating a portion of the available space towards the data block table. The available space is segmented into a series of blocks, each one large enough to hold at least one data block's worth of data. The physical memory address for each of the series of blocks is saved in an "available data block queue," which acts as a table from which the system could rapidly obtain available data blocks for use by the data block table. When a thread requests an available data block, the system could grab any block from the data block queue, whose physical memory address would be stored in the primary address portion of the data block table. When a thread wishes to delete a data block, the system could add that physical memory address back to the data block queue. The data block queue could be in the format of a table, a linked list, or an array, but is preferably a FIFO traversable queue of physical memory addresses.

Read, Write, and Erase API calls to the data block table could then be performed much more rapidly using data blocks allocated using the primary address portion of the data block table than data blocks allocated using the secondary address portion. Pointers that directly access a physical address holding a contiguous data block could be passed rapidly without extra calls to memory-handling LBA tables and the like.

A write module could be programmed to receive and execute write data requests from threads of the database storage system. For example, in an Apache Spark database storage system, a "Put Block" API could send requests to the write module. The write module could receive a request to write a data block from a thread. Then the write module could receive a physical memory address of an available data block from the available data block queue of an appropriate size to hold a full-sized data block. New data blocks that are provided to the write module are then removed from the available data block queue. For example, where the data block is an RDD block, the allocated contiguous memory space is preferably at least as large as an RDD block size. The physical memory address could be used to access the received data block. An entry for the contiguous memory space is then added to the primary address portion comprising the new physical memory address and a new data block address. The write module could then return the new data block address and a write-access pointer to the new physical memory address to the thread, allowing the thread to then write data to the newly allocated data block A read module could be programmed to receive and execute read data requests from threads of the database storage system. For example, in an Apache Spark database storage system, a "Get Block" API could send requests to the read module. The read module could receive a request to read a data block from a thread, which provides a data block address. Then the read module could correlate the data block address to a physical memory address using the primary address portion of the data block table. The read module could then return a read-only pointer to the physical memory address to the thread, allowing it to read data in the data block.

An erase module could be programmed to receive and execute erase data requests from threads of the database storage system. The erase module could receive a request to erase a data block from a thread, which provides a data block address. Then the erase module could correlate the data block address to a physical memory address using the primary address portion of the data block table. The erase module could then import the data block address and the physical memory address to the available data block queue. All data blocks that are saved in the available data block queue could be considered as "erased blocks" which could be overwritten at any time. Lastly, the erase module could delete the entry for the data block address from the primary address portion of the data block table. This effectively "moves" the data block from the primary address portion to the available data block queue without needing to waste time with actually erasing the memory space.

In some embodiments, the database storage system could be programmed to periodically overwrite space allocated to the available data block queue. For example an Apache Spark database storage system could execute an RDD cache eviction process to trigger such an explicit overwrite of all data blocks in the available data block queue.

Preferably, the database storage system has direct access to the data block table through an operating system device driver API. In this manner, storage for data blocks allocated to the database storage system could be independent of the operating system's file system storage space.

Various objects, features, aspects and advantages of the inventive subject matter will become more apparent from the following detailed description of preferred embodiments, along with the accompanying drawing figures in which like numerals represent like components.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

BRIEF DESCRIPTION OF THE DRAWING

FIG. 1 shows a schematic of an exemplary embedded memory infrastructure.

FIG. 2 shows a schematic of an alternative embedded memory infrastructure.

FIGS. 3A and 3B show schematic of exemplary data block tables of an embedded memory infrastructure.

DETAILED DESCRIPTION

Figure 4:
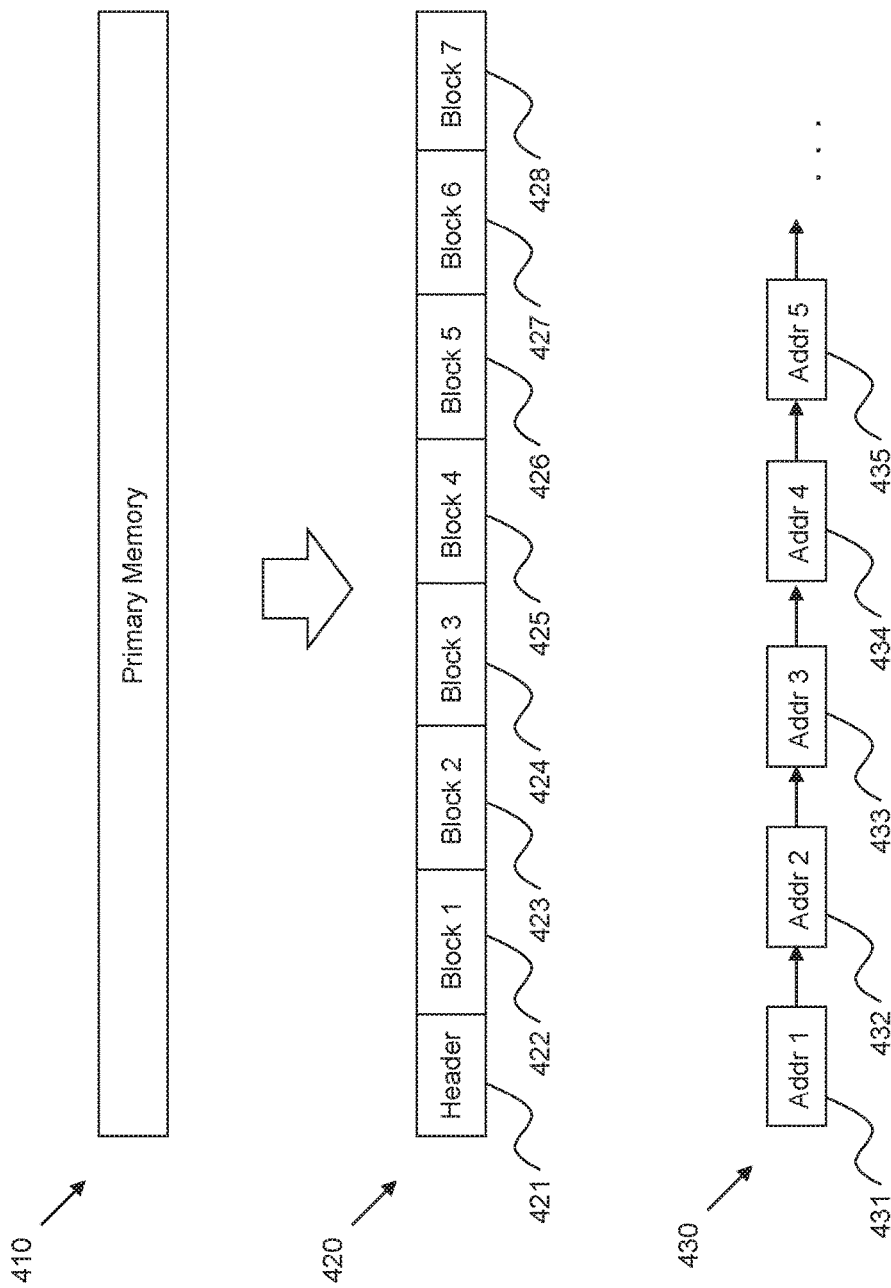
FIG. 4 shows a schematic of an exemplary primary memory of an embedded memory infrastructure.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be noted that any language directed to a computer or a computer system should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., NAS, hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. Computer software that is "programmed" with instructions is developed, compiled, and saved to a computer-readable non-transitory medium specifically to accomplish the tasks and functions set forth by the disclosure when executed by a computer processor.

One should appreciate that the disclosed techniques provide many advantageous technical effects including providing both rapid-access and slower memory access to an application.

The inventive subject matter provides apparatus, systems, and methods in which a computer system provides an embedded memory having a portion that can be accessed using physical memory addresses and a portion that can be accessed using logical memory addresses.

In FIG. 1, a software schematic 100 for an embedded memory infrastructure has an application 110, data block API 120, primary memory 130, LBA API 140, and secondary memory 150. Application 110 is an application that saves data to application data blocks on one or more data storage devices. Typically, application 110 accesses such data storage devices through an operating system or storage API that allows application 110 to send, for example, write, read, and erase commands. Preferably, the system is programmed in a transparent manner to application 110 such that application 110 does not need to use specialized, non-generic API. For example, the system could be programmed to save most recently used (MRU) data to primary memory 130 and least recently used (LRU) data to secondary memory 150. In other embodiments, application 110 could be programmed to specifically send commands to access primary memory 130 or secondary memory 150, and/or move data between primary memory 130 and secondary memory 150.

Application 110 accesses system storage using data block API 120, which translates data block addresses into primary memory addresses and/or logical block addresses using a data block table. Data block API 120 preferably directly accesses primary memory 130 using physical memory addresses, and indirectly accesses secondary memory using an LBA API. Preferably, data block API 120's interface with application 110 comprises put block, get block, and erase block commands. Preferably, data block API 120's interface with primary memory 130 comprises write, read, and erase commands. The write and read commands are preferably programmed at page or codeword granularity, and the erase command is preferably programmed at block granularity. In some embodiments, data block API 120 directly accesses the API of primary memory 130 through an OS device driver API, and preferably is independent of the file system of the OS.

Preferably data block API 120's interface with LBA API 140 translates an RDD data block to one or more LBA blocks. The LBA API 140 could be programmed to write consecutive LBAs to a V2P table, which could be programmed to combine related V2P units to minimize the write granularity. For example, where the system detects that two consecutive LBA blocks for a data block are located in consecutive LBA addresses, the system could combine the two LBA blocks into one to minimize write granularity.

FIG. 2 shows an exemplary system 200 that has a database application 210, such as an Apache Spark database application that saves data to Apache Spark data blocks—typically Resilient Distributed Dataset (RDD) data blocks. Traditional Apache Spark systems have a hierarchical storage layer to persist an RDD data block on, for example, volatile memory, non-volatile disk, and Alluxio storage. The present system adds a new layer to the storage hierarchy that could act, for example, as a rapid embedded Apache Spark SSD. By providing ultra-fast access to the embedded Apache Spark SSD, the Apache Spark SSD could be used by the Apache Spark system as second persistent memory layer in the storage layer hierarchy or a scratch pad for intermediate RDD computation. The system could be programmed such that whenever intermediate RDD computations are performed, the system persists these RDD blocks in the rapid-access, primary memory portion of the system by calling functions that are specific to the primary memory portion of the system.

Preferably, all of the APIs of an Apache Spark RDD system are provided at an RDD block level—comprising read, write, and erase block commands. Since RDD blocks are configurable, they can be configured to be larger than an LBA block size or smaller than an LBA block. For example, where an RDD block is read from Apache Hadoop, the system could be programmed to have the RDD block size set to the Apache Hadoop block size to minimize data threshing.

Each RDD has its own data block address, which could refer to a memory block saved in a data block primary portion 220 of the data block table or a data block secondary portion 230 of the data block table. The data block primary portion 220 associates each data block address to a rapidly accessed memory, such as a volatile memory DRAM 222, and/or a non-volatile memory SSD 224. Preferably, the data block primary portion only references rapidly accessible non-volatile data memory, which ensures persistence of the saved data blocks. The data block secondary portion 230 associates each data block address to a logical block address, which can be accessed using LBA table 240. LBA table 240 is used to translate addresses from other secondary memory such as hard disk drives (HDD) 242, network attached storage (NAS) 244, or computer system nodes 246. Data block secondary portion 230 could alternatively reference memory locations using existing distributed storage systems commonly used with an Apache Spark database, such as Alluxio Using this infrastructure, the APACHE SPARK database application 210 to access both rapidly accessible memory via physical memory locations with a data block primary portion 220 as well as other types of memory using logical block addresses via a data block secondary portion 230.

FIG. 3A shows an exemplary database table 310 having a primary portion 312 and a secondary portion 314. Primary portion 312 associates data block addresses #0-#9 with physical memory addresses in one or more primary memory locations while secondary portion associates data block addresses #10-19 with secondary memory addresses in one or more secondary memory locations. While only 20 data block addresses are shown here, realistically data block table would hold thousands, or even hundreds of thousands of data block addresses. Since secondary memory can typically hold much more data than primary memory, primary portion 312 could be programmed use a separate hash table (not shown) specific to primary memory physical address locations in order to speed up access to the primary memory physical address locations. While primary portion 312 and secondary portion 314 are shown as being part of one contiguous database table 310, primary portion 312 and secondary portion 314 could be separate tables in other embodiments.

In preferred embodiments, primary portion 312 comprises a V2P hashmap to increase the speed at which the physical memory address is accessed by rapidly mapping a data block address to a physical memory address. Each physical memory address in the V2P hashmap preferably represents a start of a physical location of the data block. In some embodiments, a sub-entry of the data block table comprises a list of saved blocks within nodes of the system.

FIG. 3B shows an alternative database table 320 having primary portion 322 and secondary portion 324. Primary portion 322 is similar to primary portion 312, and both associate each data block address with a physical memory address. However, secondary portion 324 is different from secondary portion 314. Whereas secondary portion 314 associates each data block address with a logical block address, secondary portion 324 associates each data block address with three logical block addresses. Typically, the size of a logical data block that is referenced by a logical block address is not configurable, and may be much smaller than an application data block. In embodiments where the logical data block is smaller than the size of the application data block, the system may need to be programmed to associate a single data block address with a plurality of logical block addresses. In some embodiments, secondary portion 324 could be programmed to reference different numbers of logical blocks for each application data block— for example where a first logical block address references logical block addresses on a HDD wand a second logical block address references logical block addresses on a NAS drive. In such embodiments, the hash table used by the primary portion 322 is also typically dedicated to primary portion 322 and is not shared with secondary portion 324, since the secondary portion 324 would have many times more addresses than primary portion 322, and its hash table would have many more collisions.

FIG. 4 shows an exemplary uninitialized primary memory 410, which has not been allocated towards an application. An initialized primary memory is shown as initialized primary memory 420, having a header 421 and allocated data blocks 422-428, respectively. Header 421 holds initialization data for the primary memory, such as the number of allocated data blocks, the size of the allocated data blocks, the data block table, an available data block queue, etc. Allocated data blocks 422-428 represent data blocks that have been allocated for an application of the system. Although only seven data blocks are allocated towards primary memory 410, systems could have more or less data blocks allocated. Preferably the system is programmed to allocate a maximum number of data blocks for a data block size. E.g. ((size of primary memory)−(size of header))/size of data block=number of data blocks allocated. Preferably, primary memory 410 comprises a memory that is dedicated towards an application, and has no other data saved upon it other than header and data block information. However, in embodiments where primary memory 410 houses other saved data, the system is preferably programmed to only allocate contiguous data blocks in primary memory 410.

Each of data blocks 422-428 have a memory address location that can be used to navigate to its data block. Each memory address location is added to available data block queue 430, which comprises a linked list of nodes 431-435 and so on. The system is preferably programmed to treat available data block queue 430 as a FIFO queue, which pops off the first available data block (in this situation node 431) when requesting an available data block, and inserts a new available data block at the end of the FIFO queue list. Since the total number of possible available data blocks is known, the available data block queue could comprise a circular buffer comprising an array of nodes that terminate in a null value. In this manner, the available data block queue need only comprise an initial pointer to the "front" of the available memory block queue, a series of memory address locations, and a null value to terminate the list of available data blocks.

In embodiments with a plurality of primary memories, the system preferably distributes data block queue 430 evenly among multiple channels to maximize write throughput and minimize read latency. For example, in embodiments with three primary memories (e.g. three SSD memories and/or three nodes), address 1 of node 431 could point to an address in a first primary memory, address 2 of node 432 could point to an address in a second primary memory, address 3 of node 433 could point to an address in a third primary memory, and address 4 of node 434 could point to an address in the first primary memory. The system could also be programmed to reshuffle data block queue 430 in a non-randomized way to ensure that consecutive nodes point to different primary memory locations. Such reshuffling could be triggered as part of a garbage collection command from the application.

Figure 5:
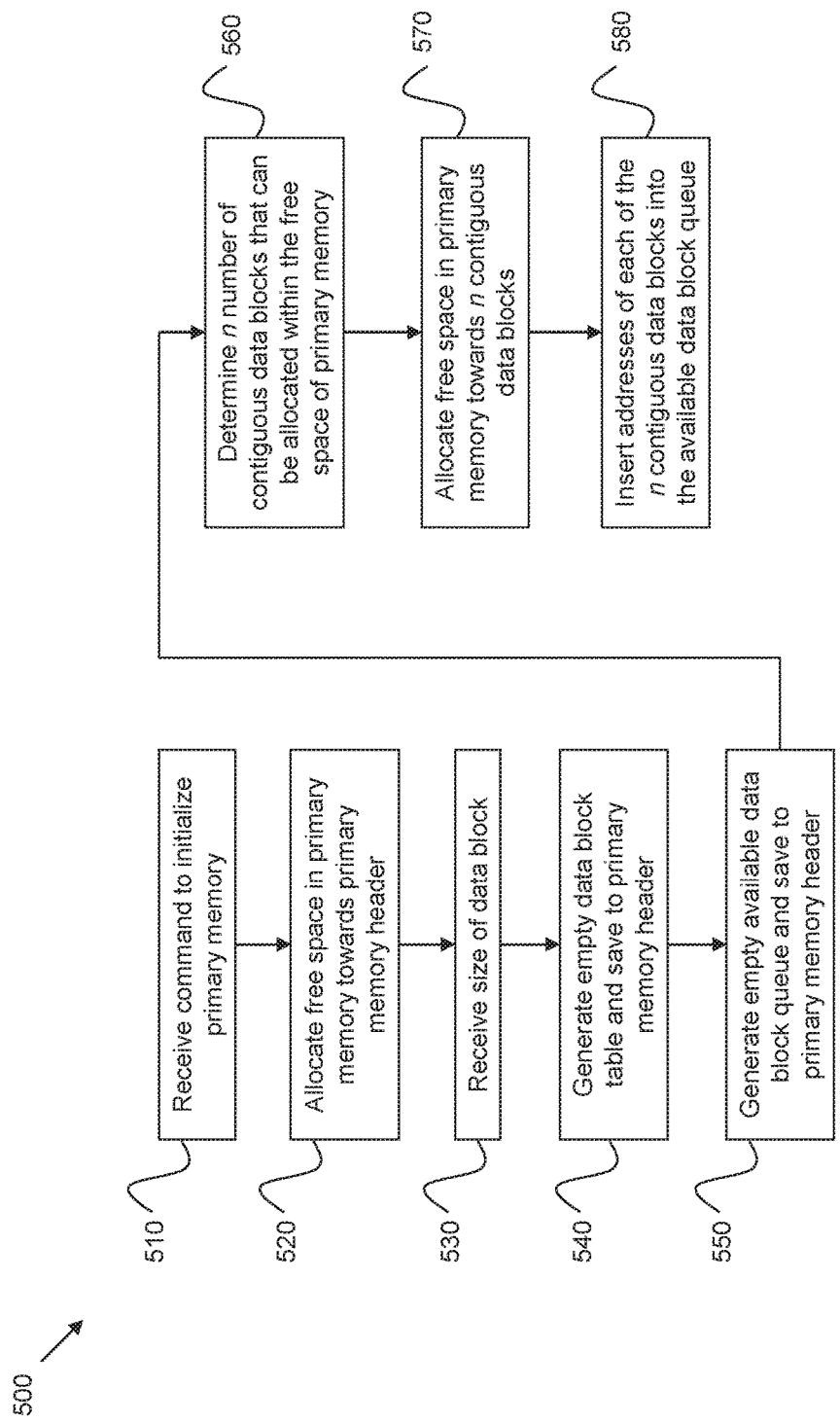
FIG. 5 shows an exemplary process used to initialize a primary memory.

FIG. 5 shows an exemplary method 500 used by a system to initialize the primary memory. In step 510, the system receives a command to initialize the primary memory. In step 520, the system allocates free space in the primary memory towards a primary memory header, such as header 421 in primary memory 410. In step 530, the system receives the size of a data block. The data block size is preferably a size that is standard to the application. For example, where the application is an Apache SPARK database, the data block size is preferably set to be at least the size of a resilient distributed database block.

In step 540, the system generates an empty data block table and saves that empty data block table to the primary memory header to house data block information. Preferably, the data block table is programmed to house at least data block table information for the data block primary memory and all known secondary memory. Should the data block table need to be extended at a future date (e.g. additional secondary memory needs to be allocated to the system) and the header in primary memory cannot hold that information, the system may be programmed to virtually "extend" the data block table to a portion of secondary memory. In essence, the system could first detect that there is additional available secondary memory allocated to the system and that the header cannot hold additional data block table information, and then the system could create a second data block table in secondary memory that acts as an extended part of the data block secondary portion. Preferably the data block table is initialized such that only certain data block addresses are allocated towards the primary portion. For example, where a primary memory holds 5000 data blocks, data block addresses 0-4999 are preferably allocated towards primary memory, and all other data block addresses are allocated towards secondary memory. In this manner, the system could quickly determine whether a data block address references a primary memory data block or a secondary memory data block simply by analyzing the value of the data block address.

In step 550, the system generates an empty available data block queue and saves that to memory, preferably as a circular buffer. In step 560, the system determines the number of contiguous data blocks that can be allocated within the free space of primary memory, and allocates that free space towards those contiguous data blocks in step 570, such as data blocks 422-428 in primary memory 410. In step 580, the system inserts the addresses of each of the allocated contiguous data blocks into the available data block queue, such as nodes 431-435 in available data block queue 430.

Figure 6:
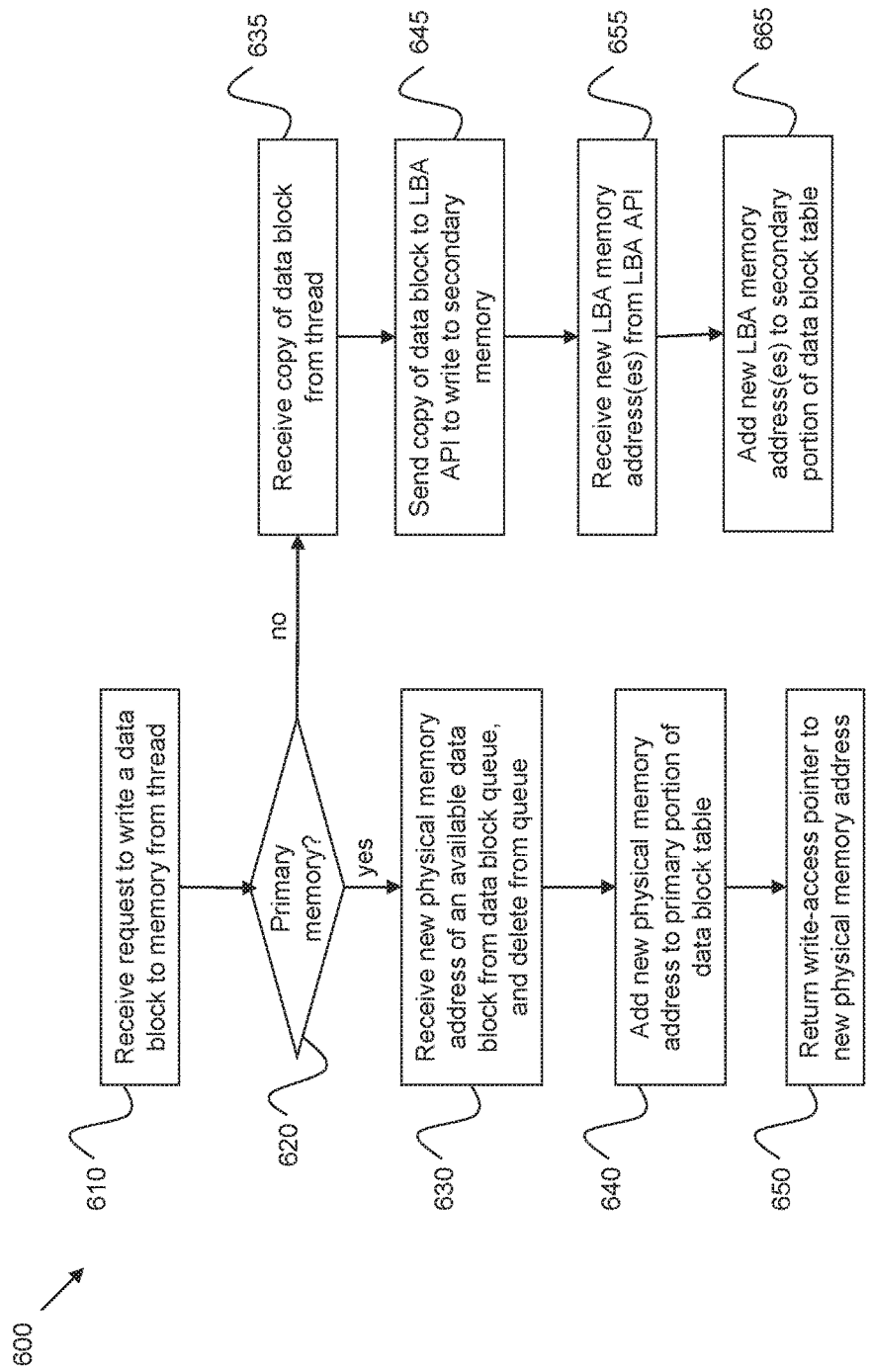
FIG. 6 shows an exemplary process used to write a data block to an embedded memory infrastructure.

FIG. 6 shows an exemplary method 600 that handles requests to write data to a data block. In step 610, the system receives a request to write a data block to the memory from a thread. In step 620, the system determines whether the request is a demand to write the data block information to primary memory, or to write the data block information to secondary memory. In some embodiments, the system is configured to have different function calls for writing a data block to primary memory or to secondary memory, or could have the same function call with a flag that is set to on/off when the calling function wishes to write a data block to primary memory or to secondary memory.

If the write request is being sent to secondary memory, the system receives a copy of the data block from the thread in step 635 and sends the copy of the data block to the LBA API in step 645. For many memory APIs, the size of the LBA cannot be configured, and so a single data block may span a few different LBAs. In these embodiments, the system may be programmed to split the data block into multiple sections, and save each portion of the data block in a different LBA, calling the LBA API several times—once for each portion of the data block saved. In step 655, the system receives one or more new LBA memory addresses from the LBA API, and adds the new LBA memory address(es) to the secondary portion of the data block table in step 665.

If the write request is being sent to primary memory, the system could then proceed to step 630. In step 630, the system queries the available data block queue and receives a new physical memory address from the available data block queue, and deletes that data block from the available data block queue. In step 540, the system then adds the new physical memory address to a primary portion of the data block table and returns a write-access pointer to the new physical memory address to the thread, so that the thread can write the data block directly to the physical memory address. In this manner, the system need not create a copy of the data block itself, allowing the thread to directly access the physical memory address location, and need not separate the data block into a plurality of LBA blocks. In some embodiments, instead of returning the write-access pointer to the thread, the system may be programmed to receive the data block information from the thread and write the data block information to the new physical memory address location.

Figure 7:
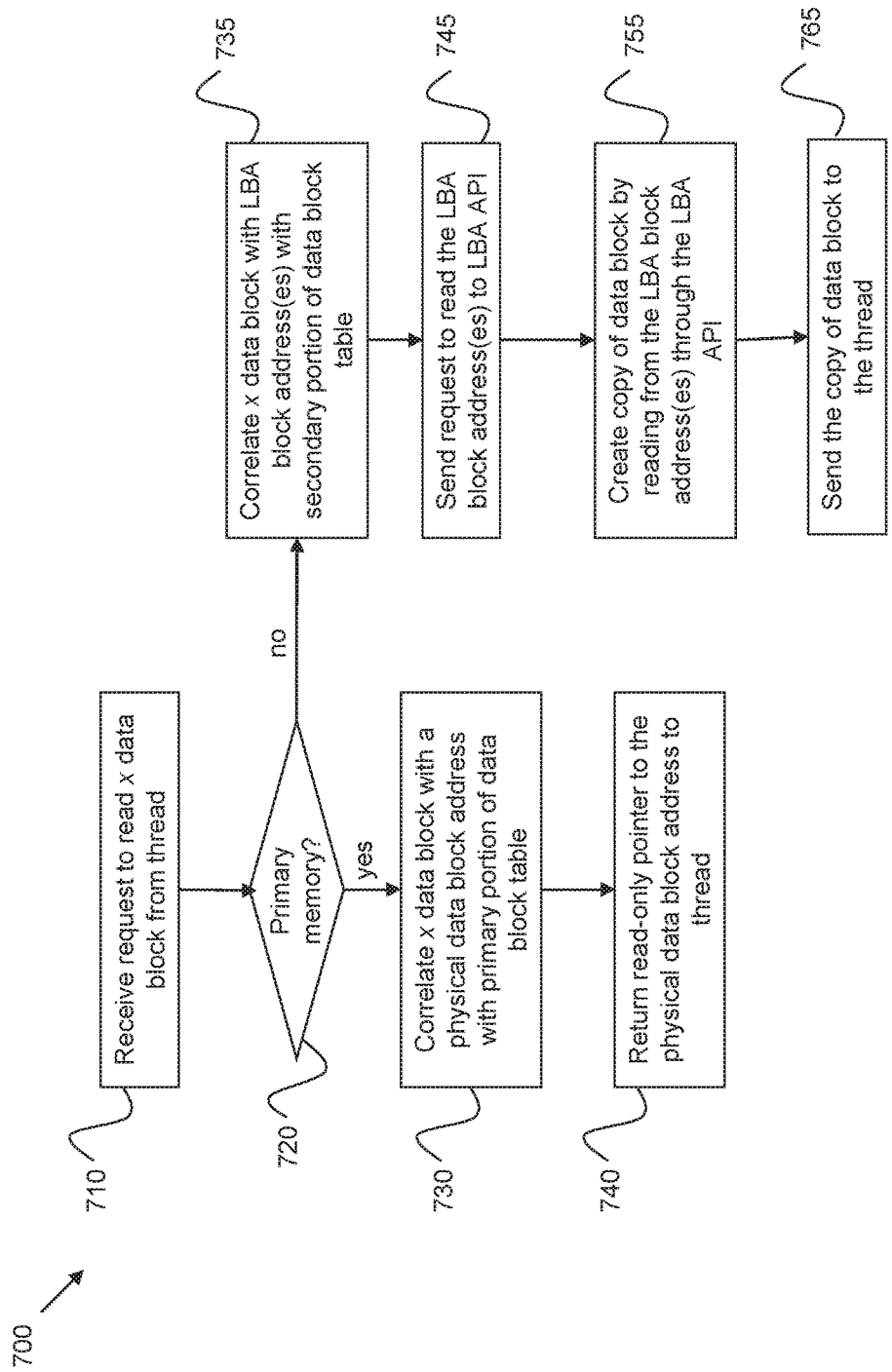
FIG. 7 shows an exemplary process used to read a data block from an embedded memory infrastructure.

FIG. 7 shows an exemplary method 700 to handle a read request from a thread. In step 710 the system receives a read request from the thread. In step 720, the system determines whether the read request is a read request for a data block in primary memory or in secondary memory. In some embodiments, the system could have a first function for a read request from primary memory and a second function for a read request from secondary memory, or could have a flag that is set on/off, but preferably the read request simply transmits a logical data block address. The system could then determine whether the logical data block address refers to a data block in primary memory or in secondary memory based upon the properties of the data block table.

If the read request is for reading a data block saved to secondary memory, the system could then correlate the data block address with one or more LBA block addresses in step 735. In step 745, the system sends the request to read the LBA block address to the LBA API and creates a copy of the data block in step 755. In embodiments where the data block was saved on a plurality of LBA blocks, the system would reconstruct the data block in memory using several calls to the LBA API—one for each LBA block. In step 765, the system then sends the copy of the data block to the thread. In some embodiments, the system could send a read-only pointer to the copy of the data block to the thread, and then deletes the copy of the data block once the thread is finished with the read request.

If the read request is for reading a data block saved to primary memory, the system could then correlate the data block with a physical data block address using the data block table and could then return a read-only pointer to the physical data block address to the thread, allowing the thread to directly read the data block from primary memory. This prevents the system from needing to create a new copy of the data block or in reconstructing a data block that is spread over several LBA blocks. In some embodiments, the system could also create a copy of the data block and send a copy of the data block to the thread that requests a read.

Figure 8:
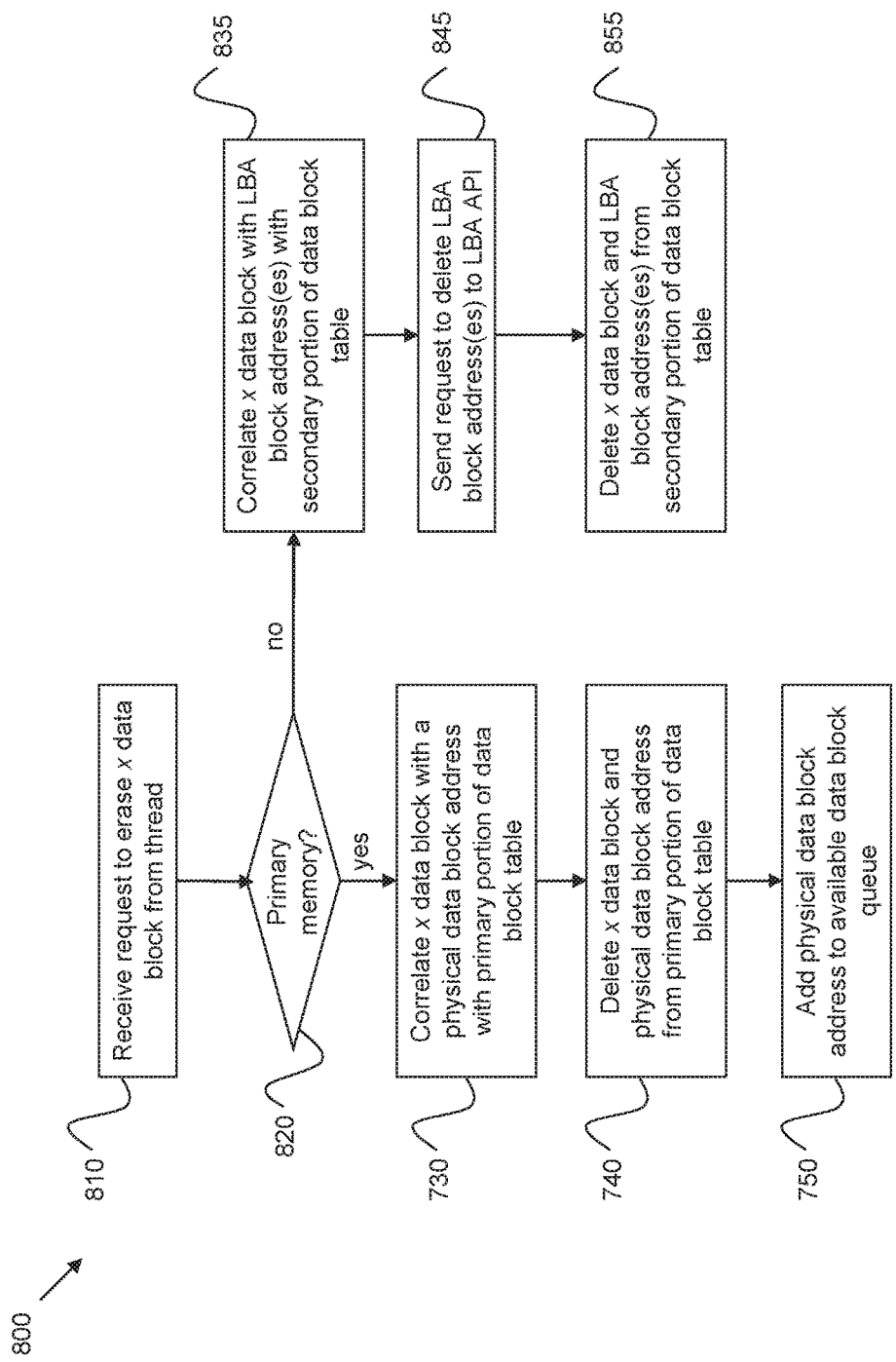
FIG. 8 shows an exemplary process used to erase a data block from an embedded memory infrastructure.

FIG. 8 shows an exemplary method 800 to erase a data block from the system. In step 810, the system receives a request to erase a data block. In step 820 the system determines whether the data block address received references a primary memory data block or a secondary memory data block—similarly to step 720.

If the erase request references a data block in secondary memory, the system then correlates the data block address with one or more LBA block addresses in step 835, and sends one or more requests to the LBA API to delete all LBA block addresses that are correlated with the data block address in step 845. In step 855, the system then deletes the data block address and corresponding LBA block address(es) from the secondary portion of the data block table.

If the erase request references a data block in primary memory, the system proceeds to step 730 to correlate the data block address with a physical data block address in the primary portion of the data block table. In step 740, the system deletes the data block address and physical data block address from the primary portion of the data block table. In step 750, the system adds the physical data block address to the available data block queue. In this manner, the system need not allocate/deallocate memory . . . the data blocks are always allocated. They are just designated as being available or not available by the system.

The inventive system improves computer functionality by extending the functionality of a data block table to (a) allocate data blocks that are of a custom-size appropriate to the application, (b) save data blocks to a rapidly accessible memory or to normal, slower memory, (c) bypass multiple layers (e.g. OS layer, LBA layer) entirely by providing direct, physical address access to calling threads. Such a system eliminates OS overheads when accessing data blocks saved to primary memory by eliminating layers in between the application and data blocks saved to primary memory. The system could also greatly simplify an FTL (Flash Translation Layer) algorithm by providing the FTL an awareness of block series access patterns that simplifies wear leveling, read disturb, and NAND mitigation processes. Mapping the size of each data block to the data block size used by the application (e.g. mapping a data block to an RDD data block size of an Apache Spark application), the FTL size is also drastically reduced since a single data block need not be spread out to multiple LBA blocks, or vice-versa. By mapping an erased RDD block to an available data block queue, the system reduces write amplification, which also reduces power consumption when accessing data blocks saved to the primary memory.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An embedded memory system, comprising:
a logical block addressing table that maps logical block addresses to secondary memory addresses of a secondary memory having a second type of memory;
a data block table having:
a secondary address portion that maps data block addresses to logical block addresses of the logical block addressing table, and
a primary address portion that maps data block addresses to physical memory addresses of a primary memory having a first type of memory, wherein the first type of memory and the second type of memory are different; and
a read module programmed to:
receive a request to read a data block at a first data block address from a first thread;
correlate the first data block address to a first physical memory address using the primary address portion of the data block table; and
return a read-only pointer to the first physical memory address to the first thread.

2. The system of claim 1, wherein the secondary address portion maps each data block address to a plurality of logical block addresses.

3. The system of claim 2, wherein the primary address portion maps each data block address to a single physical memory address of the primary memory.

4. The system of claim 3, further comprising a hashmap for the primary address portion.

5. The system of claim 4, wherein the primary address portion comprises a persistent memory for an resilient distributed dataset (RDD) database.

6. The system of claim 5, wherein the RDD database is programmed to utilize the primary address portion as an intermediate RDD computation memory space.

7. The system of claim 1, further comprising a controller that initializes the primary memory by:
allocating free space in the primary memory for a plurality of contiguous physical data blocks;
associating each of the contiguous physical data blocks with the physical memory addresses of the primary address portion; and
generating an available data block queue for the primary memory comprising each of the physical memory addresses of the allocated contiguous physical data blocks.

8. The system of claim 7, further comprising:
receiving a required data block size;
ensuring that each of the contiguous physical data blocks is at least the required data block size.

9. The system of claim 8, wherein the required data block size is determined as a function of a resilient distributed dataset block.

10. The system of claim 7, further comprising a write module programmed to:
  receive a request to write a data block from a first thread;
  receive a first available data block from the available data block queue, wherein the first available data block comprises a first physical memory address;
  add a first entry for the first available data block to the primary address portion of the data block table, wherein the first entry comprises a new first data block address and the first physical memory address; and
  return the new first data block address and a write-access pointer to the first physical memory address to the first thread.

11. The system of claim 7, further comprising an erase module programmed to:
  receive a request to erase a data block at a first data block address from a first thread; and
  correlate the first data block address to a first physical memory address using the primary address portion of the data block table;
  add the first data block address and the first physical memory address to the available data block queue; and
  delete an entry for the first data block address from the primary address portion of the data block table.

12. The system of claim 7, wherein the controller initializes the secondary memory by allocating free space in the secondary memory for a plurality of non-contiguous physical data blocks associated with a logical memory address of the secondary address portion.

13. The system of claim 1, wherein the first type of memory comprises a volatile data memory and the second type of memory comprises a non-volatile data memory.

14. The system of claim 1, wherein the logical block addressing table is further configured to dissociate a memory address from associated data blocks in a non-transitory computer readable storage medium for subsequent rewriting.

15. An embedded memory system, comprising:
  a logical block addressing table that maps logical block addresses to secondary memory addresses of a secondary memory having a second type of memory;
  a data block table having:
    a secondary address portion that maps data block addresses to logical block addresses of the logical block addressing table, and
    a primary address portion that maps data block addresses to physical memory addresses of a primary memory having a first type of memory, wherein the first type of memory and the second type of memory are different;
  a controller that initializes the primary memory by:
    allocating free space in the primary memory for a plurality of contiguous physical data blocks;
    associating each of the contiguous physical data blocks with the physical memory addresses of the primary address portion; and
    generating an available data block queue for the primary memory comprising each of the physical memory addresses of the allocated contiguous physical data blocks; and
  a write module programmed to:
    receive a request to write a data block from a first thread;
    receive a first available data block from the available data block queue, wherein the first available data block comprises a first physical memory address;
    add a first entry for the first available data block to the primary address portion of the data block table, wherein the first entry comprises a new first data block address and the first physical memory address; and
    return the new first data block address and a write-access pointer to the first physical memory address to the first thread.

16. The system of claim 15, further comprising:
  receiving a required data block size;
  ensuring that each of the contiguous physical data blocks is at least the required data block size.

17. The system of claim 16, wherein the required data block size is determined as a function of a resilient distributed dataset block.

18. The system of claim 15, further comprising a write module programmed to:
  receive a request to write a data block from a first thread;
  receive a first available data block from the available data block queue, wherein the first available data block comprises a first physical memory address;
  add a first entry for the first available data block to the primary address portion of the data block table, wherein the first entry comprises a new first data block address and the first physical memory address; and
  return the new first data block address and a write-access pointer to the first physical memory address to the first thread.

19. The system of claim 15, further comprising an erase module programmed to:
  receive a request to erase a data block at a first data block address from a first thread; and
  correlate the first data block address to a first physical memory address using the primary address portion of the data block table;
  add the first data block address and the first physical memory address to the available data block queue; and
  delete an entry for the first data block address from the primary address portion of the data block table.

* * * * *